Jan. 22, 1929.　　　　E. J. HORNBERGER　　　1,699,968
FRICTION CLUTCH
Filed March 27, 1926
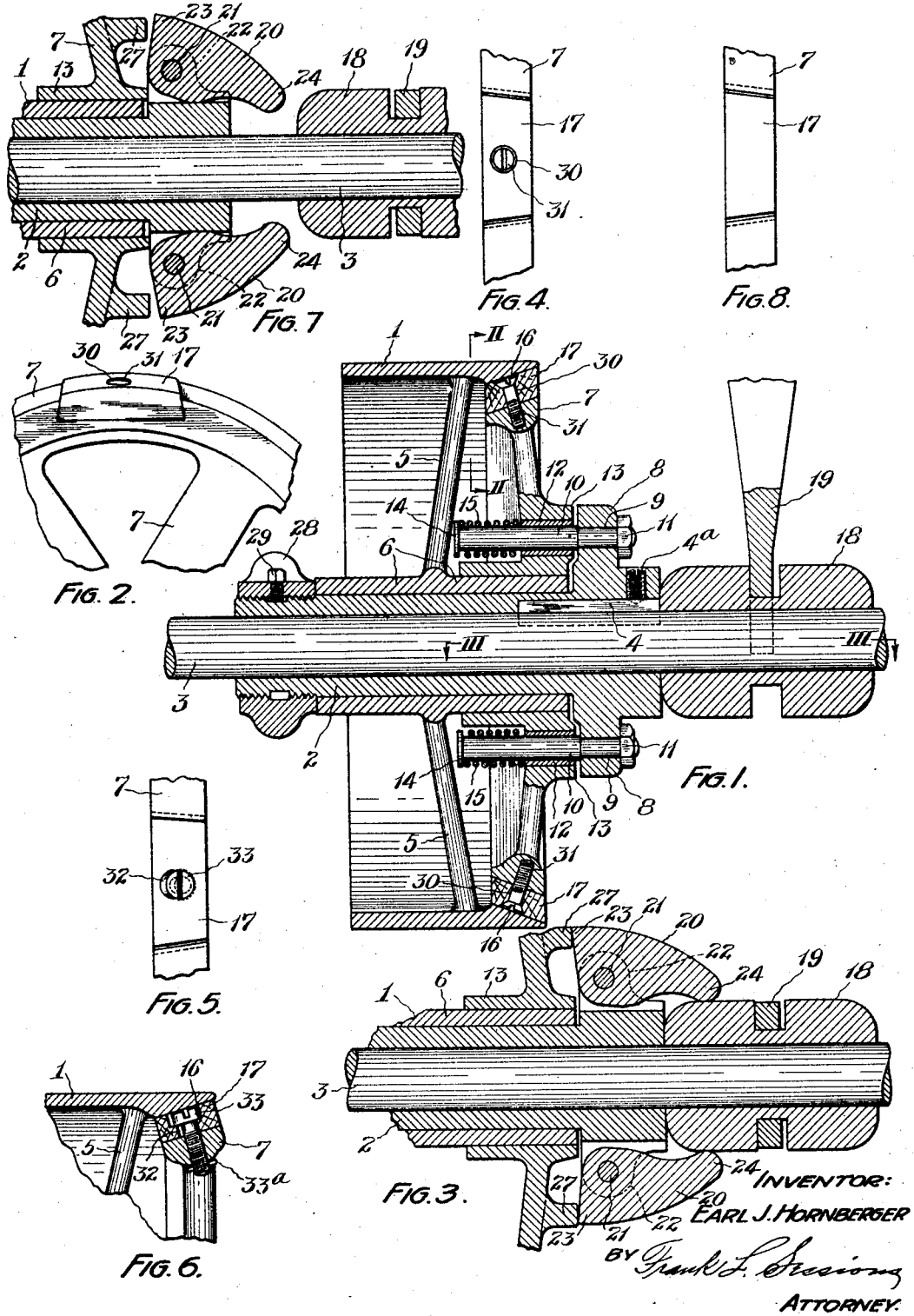
INVENTOR:
EARL J. HORNBERGER
BY Frank L. Sessions
ATTORNEY.

Patented Jan. 22, 1929.

1,699,968

UNITED STATES PATENT OFFICE.

EARL J. HORNBERGER, OF CLEVELAND HEIGHTS, OHIO, ASSIGNOR TO JOHN G. OLIVER, DOING BUSINESS AS BARDONS AND OLIVER, OF CLEVELAND, OHIO.

FRICTION CLUTCH.

Application filed March 27, 1926. Serial No. 97,895.

Among the objects of my invention are: to provide a cone friction clutch having coacting internal and external friction cone elements one of which has tapered dovetail sockets formed in its coned periphery; to provide a friction clutch with renewable wearing surfaces; to provide a friction clutch having friction inserts which may be easily inserted and removed and which are placed so that the engagement of the clutch tends to hold them tightly in position; and to provide a friction clutch which may be easily and cheaply manufactured.

It will be understood that although this specification describes my invention as applied to the type of friction clutch used in connection with line shafting, it may be used for any other purpose for which it is suitable.

My invention is shown in the accompanying drawings, in which:

Fig. 1 is a vertical longitudinal section through a clutch pulley embodying my invention, the clutch being shown engaged;

Fig. 2 is a fragmentary elevation of the friction spider taken on line II—II of Fig. 1;

Fig. 3 is a plan section taken on line III—III of Fig. 1;

Fig. 4 is a fragmentary plan view of the friction spider showing a friction insert;

Fig. 5 is a fragmentary plan view of the friction spider showing a modified form of friction insert;

Fig. 6 is a fragmentary vertical longitudinal section similar to Fig. 1 but showing a modified form of friction insert;

Fig. 7 is similar to Fig. 3 with the exception that in Fig. 7 the parts are shown in the positions they occupy when the clutch is disengaged; and Fig. 8 is similar to Fig. 4, with the exception that the friction insert is not held in the friction spider by a screw.

Referring to the drawings, the friction pulley 1 is rotatably mounted on the sleeve 2 which is keyed to the shaft 3 by the key 4. The key 4 is held in place by the set screw 4ª. The friction pulley 1 has spokes 5 and a hub 6. One end of hub 6 forms a bearing on which the friction spider 7 is rotatably and slidably mounted. Lugs 8 are formed integral with the sleeve 2 and are provided with holes 9 for the friction spider driving pins 10. These pins 10 are held securely in the holes 9 by means of nuts 11 and extend through bushings 12 which are provided in the hub 13 of the friction spider 7. As will be seen from Fig. 1, when the shaft 3 rotates it drives the sleeve 2 and attached lugs 8 through the key 4. The lugs 8 carry the pins 10 which drive the friction spider 7. The driving pins 10 are provided with flanged heads 14 which act as abutments for the compression springs 15. The function of these springs 15 is to disengage the friction surfaces of the clutch and yieldingly hold them out of engagement. Pulley 1 has a cone friction surface 16 which is adapted to frictionally engage the corresponding cone surfaces of friction inserts 17, spaced around the periphery of the friction spider 7.

The wedge 18 is adapted to be slid on the shaft 3 by the forked arm 19 in known manner. Figs. 3 and 7 show the position of the wedge 18 and the fingers 20 when the clutch is in the engaged and disengaged positions respectively. The pins 21 which support the fingers 20 are held in the lugs 22 which are preferably made integral with the sleeve 2. The fingers 20 are pivoted on the pins 21 and have knuckles 23 which, when the wedge 18 is moved longitudinally of shaft 3 to force the ends 24 of the fingers 20 apart, press against the projections 27 on the friction spider 7, compressing the springs 15 and pushing the friction inserts 17 into contact with the cone friction surface 16 of the friction pulley 1, thus establishing a driving connection between the pulley 1 and the shaft 3 through spider 7, pins 10 and sleeve 2. The adjusting nut 28 regulates the pressure which the spreading of the fingers 20 causes between the cone friction surface 16 and the friction inserts 17, and also serves to keep the pulley 1 in position on the sleeve 2. The set screw 29 serves to hold the nut 28 in position on the sleeve 2.

The friction inserts 17 are shown in detail in Figs. 2, 4, 5, 6 and 8.

The recesses in the rim of the friction spider 7 into which the inserts fit, are dovetailed as seen in Fig. 2 and tapered so that they are wider on the smaller diameter of the rim of the friction spider 7 than they are on its larger diameter, as shown in Figs. 2, 4, 5 and 8. The friction inserts are made to fit the tapered, dovetailed recesses in the rim of the friction spider 7. They are slid in from the wide end of the recess and when they are in the position shown in Fig. 4, they fit the recess tightly and can only be removed by sliding them out of the wide end of the recess. Due to the tapered and dovetailed shape of the recesses, it will be evident that the engagement of the clutch which takes place when the friction inserts 17 of the spider 7 are contacting with the cone friction surface 16 of the friction pulley 1, tends to force the tapered friction inserts 17 more tightly into the recesses in the rim of the spider 7.

As shown in Fig. 1, the friction inserts 17 may be provided with holes 30 through which screws 31 extend and screw into the friction spider 7. The purpose of the screws 31 is to aid in holding the friction inserts 17 in place, particularly when the clutch is being disengaged.

I prefer to make the friction inserts 17 out of standard commercial fiber but they may be made out of any suitable material such as wood, bakelite or metal.

Figs. 5 and 6 show a modified form of friction insert in which a slotted hole 32 is provided for the fillister head screw 33. This slotted hole 32 extends in a direction parallel to the shaft 3 and is so positioned in the friction insert that when the screw 33 is in place it prevents any movement of the insert in the direction which tends to remove it from its position in the friction spider 7 but allows the insert to be forced more tightly into the recess in the rim of the spider 7.

In Fig. 6, the screw 33 extends through the rim of friction spider 7 and is drilled to take the cotter pin 33ª, which serves to keep the screw 33 from working loose and scratching the cone surface 16 of the friction pulley 1.

The friction inserts 17 are made thicker radially of the clutch cones than the depth of the slots which hold them in the friction spider 7 so as to provide for wear. When they wear down flush with the cone rim of the friction spider 7 they should be replaced by removing the set screws 31 or 33, if employed, and knocking out the worn inserts and replacing them with new ones.

I am aware that cone friction clutches have been proposed having dovetail sockets formed in cylindrical surfaces for holding friction inserts having their exposed surfaces shaped to fit the opposed friction member, but, so far as I am aware, tapered dovetail sockets holding friction inserts formed to resist displacement by the engagement of the clutch have not been proposed prior to my invention. These inserts are shown and described as being in the rim of the friction spider but they could be similarly mounted on the internal cone of the friction pulley.

I claim:—

1. In a friction clutch, the combination with co-acting internal and external cone friction members, of a plurality of friction inserts set in tapered and dovetailed recesses in the conical rim of one of said friction members, said inserts and said recesses being widest at the small end of the friction member in which they are located.

2. A friction clutch comprising a friction ring having an internal conical friction surface, a friction spider having an external conical rim, said friction spider having a plurality of slots spaced about the circumference of said rim, said slots extending the full width of said rim and being dovetailed radially and tapered axially of said rim, friction inserts fitting tightly in said slots and having wearing portions extending out from the surface of said rim, and means for causing the engagement and disengagement of said internal conical friction surface and said friction inserts.

3. In a friction clutch an external cone friction member having tapered, dovetailed slots in its conical periphery, said slots being widest at the small diameter of said cone and friction inserts held in said slots, said inserts being thicker than the depth of said slots, and an internal cone friction member adapted to co-act with said friction inserts.

4. A friction clutch comprising co-acting internal and external cone friction members, said external cone friction member having a plurality of slots extending the full width of its rim, said slots being dovetailed radially and tapered axially of said external cone friction member, friction inserts adapted to fit tightly in said slots and removable means for retaining said friction inserts in said slots.

5. In a clutch of the co-acting internal and external cone friction member type, friction inserts dovetailed radially and tapered axially adapted to fit in slots in one of said cone friction members, said slots and said friction inserts being so formed that the engagement of said clutch will tend to force said inserts tighter into said slots and removable means for retaining said inserts in said slots.

6. A cone friction member having a slot in its periphery, a friction insert adapted to fit in said slot and means extending through a slotted hole in said friction insert and attached to said cone friction member for retaining said friction insert in said slot while allowing a limited movement of said friction insert in a direction axial of said cone friction member.

7. A friction clutch comprising co-acting internal and external friction cone members, one of said cone friction members having dovetailed, tapered sockets in its periphery widest at the small end of the cone, and friction inserts in said sockets.

EARL J. HORNBERGER.